United States Patent
Zhang et al.

(10) Patent No.: US 10,102,503 B2
(45) Date of Patent: Oct. 16, 2018

(54) SCALABLE RESPONSE PREDICTION USING PERSONALIZED RECOMMENDATION MODELS

(71) Applicant: LinkedIn Corporation, Mountain View, CA (US)

(72) Inventors: XianXing Zhang, Mountain View, CA (US); Yitong Zhou, Sunnyvale, CA (US); Yiming Ma, Menlo Park, CA (US); Bee-Chung Chen, San Jose, CA (US); Liang Zhang, Fremont, CA (US); Deepak Agarwal, Sunnyvale, CA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 374 days.

(21) Appl. No.: 15/145,061

(22) Filed: May 3, 2016

(65) Prior Publication Data

US 2017/0323268 A1 Nov. 9, 2017

(51) Int. Cl.
*G06Q 10/10* (2012.01)
*G06F 17/30* (2006.01)

(52) U.S. Cl.
CPC ..... *G06Q 10/1053* (2013.01); *G06F 17/3053* (2013.01)

(58) Field of Classification Search
CPC .................. G06Q 10/1053; G06F 17/3053
See application file for complete search history.

(56) References Cited

U.S. PATENT DOCUMENTS

| | | | |
|---|---|---|---|
| 7,472,097 B1 * | 12/2008 | Scarborough | G06N 3/0454 706/26 |
| 8,661,030 B2 * | 2/2014 | El-Saban | G06F 17/30864 707/723 |
| 8,909,564 B1 * | 12/2014 | Kaplow | G06N 99/005 706/12 |
| 9,900,358 B1 * | 2/2018 | Tomkins | G06F 17/30041 |
| 2007/0050411 A1 * | 3/2007 | Hull | G06F 17/3002 |
| 2014/0279622 A1 * | 9/2014 | Lamoureux | G06Q 10/1053 705/319 |
| 2014/0280251 A1 * | 9/2014 | Somekh | G06F 17/30867 707/754 |

(Continued)

OTHER PUBLICATIONS

Keropyan, Aras; Gil-Lafuente, Anna Maria; "A personal selection model using Galois group theory." Kybernetes, vol. 42 No. 5, 2013 pp. 711-719. Mar. 26, 2013 (Year: 2013).*

(Continued)

*Primary Examiner* — Amanda C Abrahamson
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains a global version of a statistical model and a user-specific version of the statistical model for a user. Next, the system applies the global version to member features of the user and job features of a set of jobs to generate a first ranking of the jobs for the user. The system then applies the user-specific version to the member features and the job features for a highest-ranked subset of jobs in the first ranking to generate a second ranking of the jobs for the user. Finally, the system outputs at least a portion of the second ranking as a set of job recommendations.

20 Claims, 6 Drawing Sheets

(56) References Cited

U.S. PATENT DOCUMENTS

| | | | | |
|---|---|---|---|---|
| 2015/0006422 | A1* | 1/2015 | Carter | G06Q 10/1053 |
| | | | | 705/321 |
| 2015/0127565 | A1* | 5/2015 | Chevalier | G06Q 10/00 |
| | | | | 705/319 |
| 2015/0381552 | A1* | 12/2015 | Vijay | H04L 51/32 |
| | | | | 709/206 |
| 2016/0055426 | A1* | 2/2016 | Aminzadeh | G06N 99/005 |
| | | | | 706/12 |
| 2016/0378437 | A1* | 12/2016 | Patino-Bueno | G06F 8/20 |
| | | | | 717/105 |
| 2017/0004160 | A1* | 1/2017 | Turner | G06F 17/30321 |

OTHER PUBLICATIONS

Diaby, Mamadou; Viennet, Emmanuel, "Taxonomy-based Job Recommender Systems on Facebook and LinkedIn Profiles." IEEE. 2014 (Year: 2014).*

\* cited by examiner

SCALABLE RESPONSE PREDICTION USING PERSONALIZED RECOMMENDATION MODELS

BACKGROUND

Field

The disclosed embodiments relate to recommendation systems. More specifically, the disclosed embodiments relate to techniques for performing scalable response prediction using personalized recommendation models.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner. For example, conventional software tools and/or storage mechanisms may be unable to handle petabytes or exabytes of loosely structured data that is generated on a daily and/or continuous basis from multiple, heterogeneous sources. Instead, management and processing of "big data" may require massively parallel software running on a large number of physical servers and/or nodes, as well as synchronization among the servers and/or nodes.

Consequently, big data analytics may be facilitated by mechanisms for efficiently and/or effectively collecting, storing, managing, compressing, transferring, sharing, analyzing, and/or visualizing large data sets.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
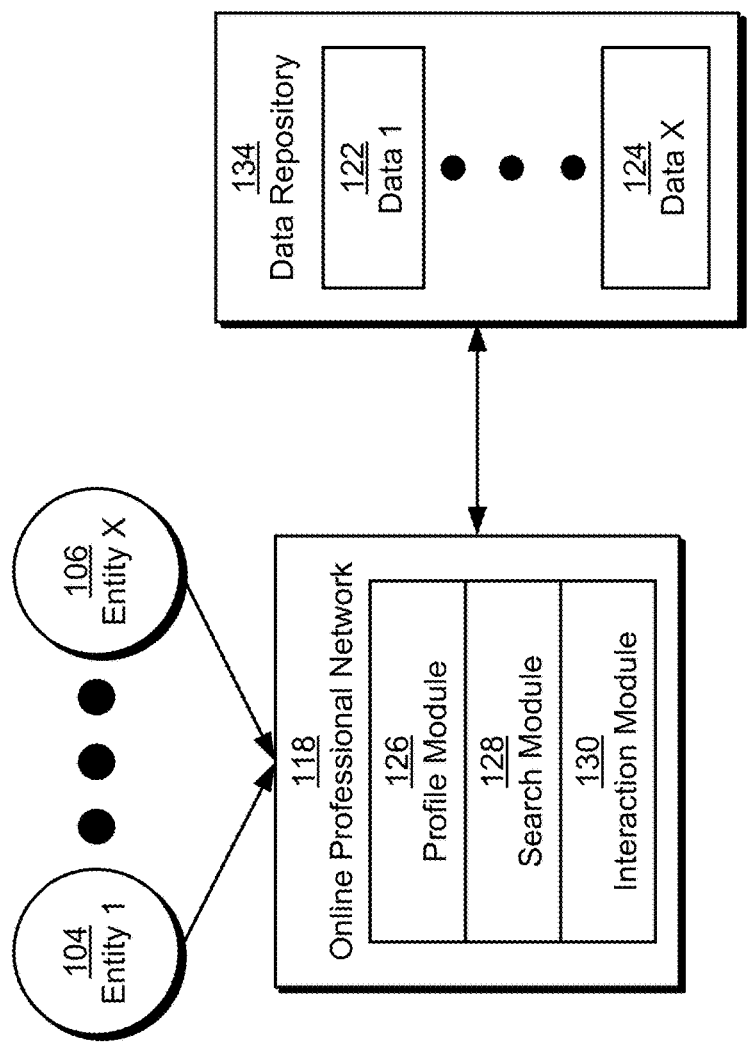
FIG. 1 shows a schematic of a system in accordance with the disclosed embodiments.

The disclosed embodiments provide a method, apparatus, and system for processing data. As shown in FIG. 1, the data may be associated with an online professional network 118 that is used by a set of entities (e.g., entity 1 104, entity x106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. Profile module 126 may also allow the entities to view the profiles of other entities in the online professional network.

The entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature of the online professional network to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, interaction module 130 may allow an entity to add other entities as connections, follow other entities, send and receive messages with other entities, join groups, and/or interact with (e.g., create, share, re-share, like, and/or comment on) posts from other entities.

Those skilled in the art will appreciate that online professional network 118 may include other components and/or modules. For example, the online professional network may include a homepage, landing page, and/or content feed that provides the latest postings, articles, and/or updates from the entities' connections and/or groups to the entities. Similarly, online professional network 118 may include features or mechanisms for recommending connections, job postings, articles, and/or groups to the entities.

In one or more embodiments, data (e.g., data 1 122, data×124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in the online professional network may be tracked and stored in a database, data warehouse, cloud storage, and/or other data-storage mechanism providing data repository 134.

In one or more embodiments, data in data repository 134 is used to generate job recommendations within online professional network 118. For example, one or more components of the online professional network may track searches, clicks, views, text input, conversions, and/or other feedback during the entities' interaction with a job search tool in the online professional network. The feedback may be stored in data repository 134 and used as training data for one or more statistical models, and the output of the statistical model(s) may be used to display and/or otherwise recommend a number of job listings to current or potential job seekers in the online professional network.

Figure 2:
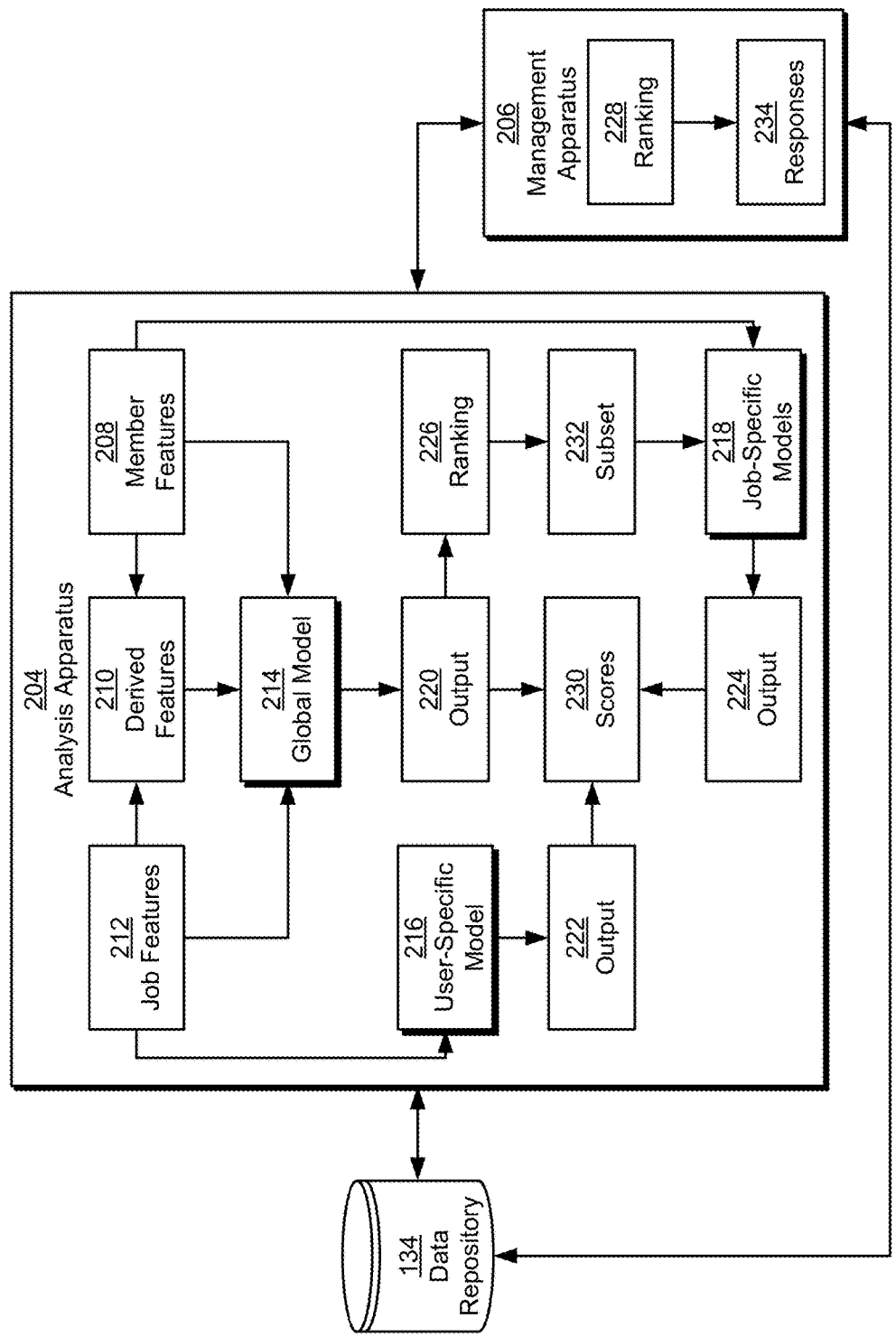
FIG. 2 shows a system for processing data in accordance with the disclosed embodiments.

In one or more embodiments, job recommendations in online professional network 118 are generated using a combination of global and customized statistical models in a way that scales with large numbers of both entities and jobs in the online professional network. As shown in FIG. 2, the statistical models may include a global model 214, a user-specific model 216, and a number of job-specific models 218. The statistical models may be stored in data repository 134 and/or another repository for subsequent retrieval, use, and/or updating by an analysis apparatus 204, management apparatus 206, and/or another component of a system containing the components depicted in FIG. 2.

Global model 214 may be a single statistical model that tracks the behavior or preferences of all users (e.g., entities associated with online professional network 118 of FIG. 1) with respect to all jobs in data repository 134. For example, global model 214 may be a logistic regression model that predicts the probability of a user applying for a job, given the user's impression of a job listing or description for the job. Features that are used by the global version may include member features 208 of the user, such as the user's title, skills, education, seniority, industry, location, and/or other attributes from the user's profile with a social network, online professional network, and/or other source of personal or demographic information for the user. The features may also include declared or inferred job features 212 of the job, such as the job's title, industry, seniority, desired skill and experience, salary range, and/or location. The features may additionally include a context of the impression, such as a time and location (e.g., geographic location, application, website, web page, etc.) at which the job is to be shown to the user. Finally, the features may include derived features 210 that are calculated from the member and job features, such as cross products, cosine similarities, statistics, and/or other combinations, aggregations, scaling, and/or transformations of the member and/or job features.

User-specific model 216 may be personalized to the individual behavior or preferences of the user with respect to certain job features, and each job-specific model may identify the relevance or attraction of the corresponding job to certain member features. Input to user-specific model 216 may include some or all job features 212 used by global model 214, and input to each job-specific model may include some or all member features 208 used by the global model. Alternatively, user-specific model 216 and job-specific models 218 may use different combinations of member, job, and/or derived features, including features that are not used by the global model.

The output of global model 214, user-specific model 216, and job-specific models 218 may be combined to generate a score representing the user's predicted probability of applying to the jobs, clicking on the jobs, and/or otherwise responding positively to impressions of the jobs after the user is shown the jobs. For example, a generalized linear mixed model for predicting the probability of member m applying to job j using logistic regression may be represented using the following equation:

$$g(E[y_{mjt}]) = x'_{mjt}b + s'_j\alpha_m + q'_m\beta_j,$$

where $$g(E[y_{mjt}]) = \log\frac{E[y_{mjt}]}{1 - E[y_{mjt}]}$$

is the link function for the model, b is the coefficient vector representing the fixed effects of global model 214, $\alpha_m$ is a coefficient vector representing the random effects of user-specific model 216 for member m, and $\beta_j$ is a coefficient vector representing the random effects of the job-specific model for job j. In addition, $x_{mjt}$ represents the feature vector for the global model, which contains member features 208 of member m, job features 212 of job j, derived features 210, and/or features associated with context t. Finally, $s_j$ represents the feature vector of job j (i.e., job features 212), and $q_m$ represents the feature vector of member m (i.e., member features 208).

To train global model 214, user-specific model 216, and job-specific models 218, analysis apparatus 204 and/or another component of the system may use a parallel block-wise coordinate descent (PBCD) technique. In the PBCD technique, a number of computing nodes may execute in parallel and use a set of sample responses from previous user interaction with outputted jobs or job recommendations to iteratively solve for the posterior mode of the random and fixed effects in the models. However, the number of random effects coefficients may be significantly larger than the number of fixed effects coefficients since a different set of random effects may be learned for each of millions of users or jobs, while a single set of fixed effects coefficients may be learned for all users and jobs. As a result, the processing overhead associated with updating the random effects in PBCD may be strongly affected by the network communication cost associated with communicating or broadcasting updates to the random effects across the computing nodes.

To reduce such network communication costs, feature vectors associated with a given set of users or jobs may be grouped with training data for the same users and jobs, and each group of features and training data may be collocated in the same computing node. Each computing node may then, in parallel with the other computing nodes, solve a local optimization problem to learn the random effect coefficients from a grouped set of data without having to communicate the coefficients with other computing nodes.

After global model 214, user-specific model 216, and job-specific models 218 are produced from training data, the models may be used to select a subset of jobs for recommending to the user. For example, the global model, user-specific model, and each job-specific model may be combined with member features 208 of the user, job features 212 of the job represented by the job-specific model, and/or derived features 210 calculated from the member and/or job features to predict the user's probability of applying to each job. The jobs may then be ordered by descending probability, and the jobs with the highest probabilities may be outputted to the user by management apparatus 206.

On the other hand, the use of job-specific random effects to score all jobs for every user may be unable to scale with the number of jobs. For example, data repository 134 may have up to tens of millions of jobs, each with a separate set of hundreds or thousands of coefficients in a corresponding job-specific model. In turn, the large number of features and/or coefficients required to score all jobs for the user using global model 214, user-specific model 216, and job-specific models 218 may result in levels of latency that are incompatible with a production environment.

To reduce the latency of model processing to manageable levels, analysis apparatus 204 may use a two-stage ranking process to identify a subset of jobs as candidates for recommending to the user. In the first stage, analysis apparatus 204 may apply global model 214 to member features 208, job features 212, and/or derived features 210 to generate output 220 that is used to produce a first ranking 226 of the jobs for the user. For example, analysis apparatus 204 may provide derived features 210 containing cosine similarities and/or other measurements of similarity between pairs of member and job features (e.g., skills, job titles, seniorities, keywords, etc.) to global model 214 to obtain global scores for all jobs in data repository 134. Analysis apparatus 204 may additionally, or instead, provide other member features, job features, and/or derived features (e.g., cross products) to global model 214 to generate global scores that are used in ranking 226. If two users have identical member features, global model 214 may produce the same set of global scores for both users.

Because the amount of data in job features 212 and/or derived features 210 for the jobs may be too large to retrieve and process at the same time, analysis apparatus 204 may use an inverted index and/or other type of index structure to retrieve subsets of the job and/or derived features for scoring by the global model. For example, keys in the inverted index may include values of one or more job features (e.g., job titles, skills, keywords, seniorities, etc.), and values to which the keys are mapped may include vectors of coefficients and/or job features for jobs containing the values. Analysis apparatus 204 may use each key to retrieve the job features for a subset of jobs to which the key is mapped in the inverted index and apply global model 214 to the job features for each job in the subset, member features 208, and/or derived features 210 to obtain a global score for the job. After job features for all jobs associated with a given key have been processed, analysis apparatus 204 may repeat the process with a different key in the inverted index until global scores have been generated for all jobs, one subset at a time.

Analysis apparatus 204 may optionally use the inverted index to omit processing of job features 212 for some jobs in data repository 134. For example, analysis apparatus 204 may match some or all member features 208 to keys in the inverted index and use global model 214 to calculate global scores only for the jobs to which the keys are mapped. In turn, analysis apparatus 204 may avoid processing of jobs with job features that have little or no commonality with the member features.

After a set of global scores is generated for the jobs using global model 214, analysis apparatus 204 may generate ranking 226 from the scores and select a subset 232 of the jobs using ranking 226. For example, analysis apparatus 204 may rank the jobs by descending global score and select a highest-ranked subset of the jobs for additional processing in the second stage. The highest-ranked subset may be represented by a pre-specified number of jobs (e.g., the top 1000 jobs in the ranking) and/or jobs with scores that exceed a minimum value.

Next, analysis apparatus 204 may execute the second stage by using global model 214, user-specific model 216, and a subset of job-specific models 218 for jobs in subset 232 to generate a set of user-specific scores 230 for the jobs. For example, analysis apparatus 204 may retrieve the user-specific model to which a member identifier for the user is mapped and the job-specific model to which a job identifier for each job in the subset is mapped from data repository 134, the inverted index, and/or another mechanism for organizing or storing statistical models. Analysis apparatus 204 may then calculate the user-specific score for each job as a linear combination of output 220 from global model 214, output 222 from user-specific model 216, and output 224 from the job-specific model for the job, as represented using the general linear mixed model above.

After user-specific scores 230 are produced for subset 232, analysis apparatus 204 and/or management apparatus 206 may generate a second ranking 228 of jobs in the subset for the user. For example, the second ranking may list the jobs in descending order of user-specific score, so that a job that is ranked highly has a higher predicted positive response (e.g. click, apply, etc.) to an impression of the job by the user than a job that is ranked less highly.

Management apparatus 206 may then output some or all jobs in ranking 228 as a set of job recommendations to the user. For example, management apparatus 206 may display some or all of the jobs in the ranking within a job search tool and/or a website or application for accessing the online professional network. In another example, management apparatus 206 may transmit an email, notification, text message, and/or other communication containing the jobs to the user.

Management apparatus 206 may also track one or more responses 234 of the user to the outputted ranking 228. For example, management apparatus 206 may track positive responses as the user's clicking on and/or applying to jobs in the ranking. Conversely, management apparatus 206 may track negative responses as the user's lack of interaction with the outputted jobs. Management apparatus 206 may store the responses in data repository 134, and analysis apparatus 204 and/or another component of the system may update the statistical models using the responses.

By generating job recommendations from a combination of global model 214 that tracks the fixed effects of multiple users and jobs with customized models (i.e., user-specific model 216, job-specific models 218) that track the random effects of individual users and jobs, the system of FIG. 2 may more accurately predict the users' responses to the jobs than response prediction techniques that include only fixed effects or random effects. Moreover, the filtering of jobs using the global model before scoring of the jobs using the customized models may allow scoring and ranking using the models to scale with the number of users, jobs, and/or coefficients in the models.

Those skilled in the art will appreciate that the system of FIG. 2 may be implemented in a variety of ways. First, analysis apparatus 204, management apparatus 206, and/or data repository 134 may be provided by a single physical machine, multiple computer systems, one or more virtual machines, a grid, one or more databases, one or more filesystems, and/or a cloud computing system. Analysis apparatus 204 and management apparatus 206 may additionally be implemented together and/or separately by one or more hardware and/or software components and/or layers.

Second, a number of statistical models and/or techniques may be used to generate rankings 226-228, output 220-224, and/or scores 230. For example, the functionality of each statistical model may be provided by a regression model, artificial neural network, support vector machine, decision tree, naïve Bayes classifier, Bayesian network, clustering technique, collaborative filtering technique, hierarchical model, and/or ensemble model. The retraining or execution of the statistical models may also be performed on an offline, online, and/or on-demand basis to accommodate requirements or limitations associated with the processing, performance, or scalability of the system.

Third, additional statistical models and/or features may be included in the calculation of the rankings and/or scores to modulate the output of the system. For example, the output of a matrix factorization component containing member and job factors associated with a given user and job may be included with output 220-224 in the calculation of scores 230. In another example, different numbers of stages and/or statistical models at each stage may be used to filter the jobs and/or produce rankings of the jobs for recommending to the user.

Finally, the statistical models may be adapted to different types of features, responses, and/or predictions. For example, a combination of global and customized models and multiple stages of ranking and/or scoring may be used to predict user responses to advertisements, products, services, events, activities, classes, games, movies, music, articles, connection recommendations, and/or other items.

Figure 3:
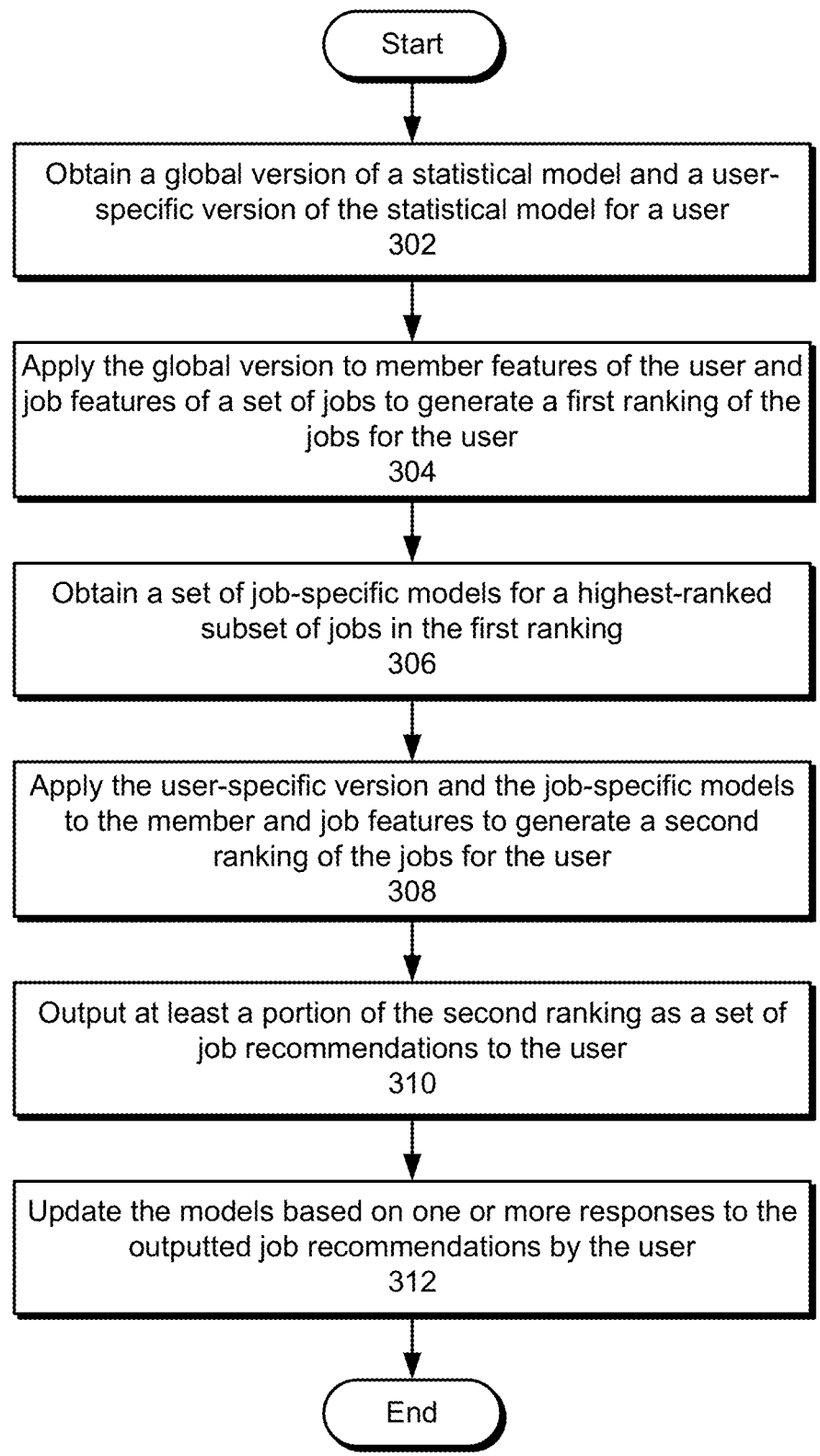
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a global version of a statistical model and a user-specific version of the statistical model for a user are obtained (operation 302). The global version may include fixed effects associated with the responses of a set of users to a set of jobs, and the user-specific version may include random effects associated with the user's specific responses to some of the jobs.

Next, the global version is applied to member features of the user and job features of a set of jobs to generate a first ranking of the jobs for the user (operation 304), as described in further detail below with respect to FIG. 4. The global version may also, or alternatively, be applied to derived features that are produced from the member and/or job features, such as cosine similarities between one or more member features and one or more job features and/or cross products of one or more member features and one or more job features. A set of job-specific models is then obtained for a highest-ranked subset of jobs in the first ranking (operation 306), and the user-specific version and job-specific models are applied to the member and job features to generate a second ranking of the jobs for the user (operation 308), as described in further detail below with respect to FIG. 5.

At least a portion of the second ranking is then outputted as a set of job recommendations to the user (operation 310). For example, some or all of the jobs in the second ranking may be shown to the user in a website, application, email, message, and/or other communication. Finally, the models are updated based on one or more responses to the outputted job recommendations by the user (operation 312). For example, the user's positive and negative responses to impressions of the job recommendations may be used as additional training data for the global version, user-specific version, and/or job-specific versions. In turn, retraining of the statistical models using the additional training data may improve the accuracy of the statistical models and subsequent responses of the user and/or other users to the job recommendations.

Figure 4:
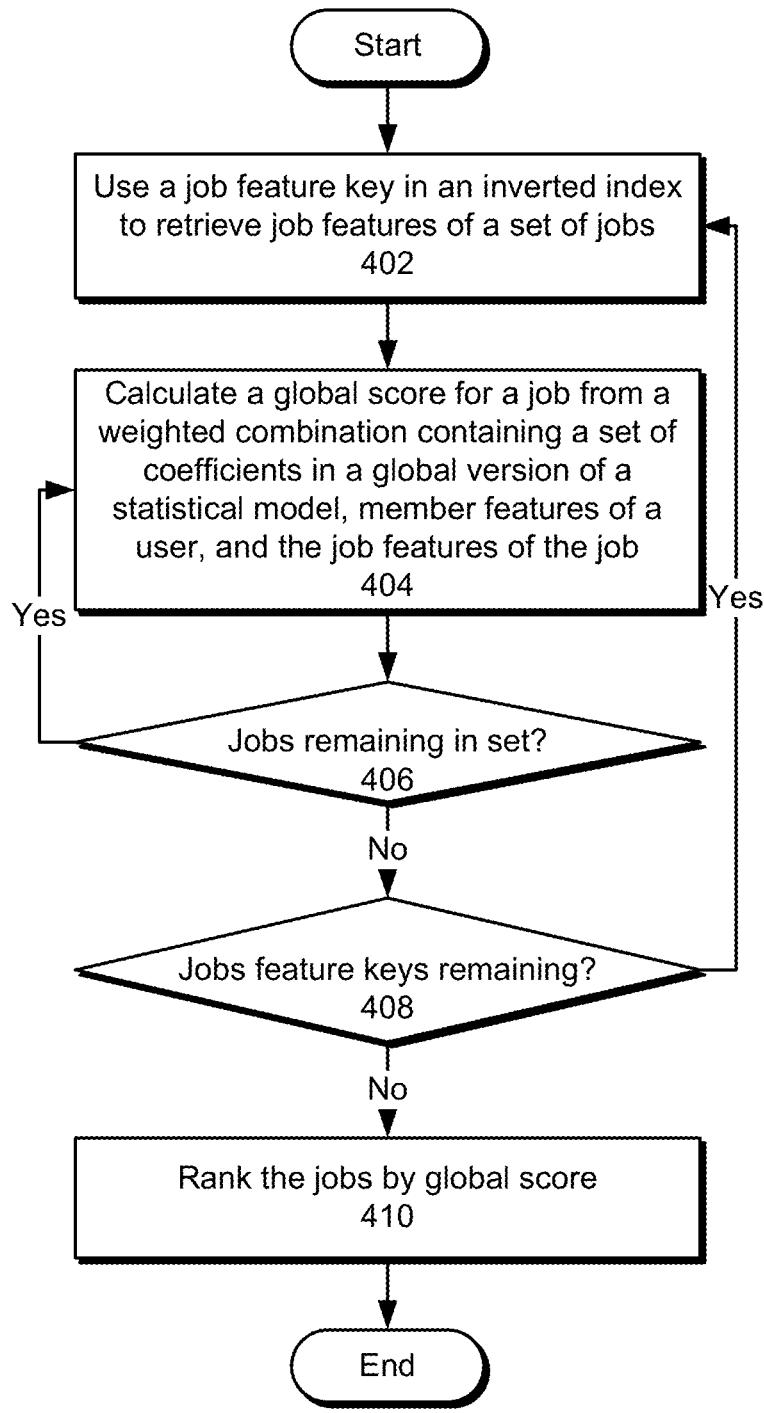
FIG. 4 shows a flowchart illustrating the process of using a global version of a statistical model to generate a ranking of jobs for a user in accordance with the disclosed embodiments.

FIG. 4 shows a flowchart illustrating the process of using a global version of a statistical model to generate a ranking of jobs for a user in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a job feature key in an inverted index is used to retrieve job features of a set of jobs (operation 402). For example, the job feature key may include one or more values of the job features and map to jobs with job features that contain and/or are matched to the value(s). Next, a global score is calculated for a job in the set from a weighted combination containing a set of coefficients in a global version of a statistical model, member features of a user, and the job features of the job (operation 404). For example, a logistic regression model may be used to obtain the global score from a linear combination of the coefficients and features. Calculation of the global score in operation 404 may be repeated for remaining jobs in the set (operation 406) until global scores have been calculated for all jobs in the set.

Operations 402-406 may be repeated for remaining job feature keys (operation 408) in the inverted index, such as other values of the job features in the inverted index. For each job feature key, job features of a set of jobs to which the key is mapped are retrieved (operation 402), and the global version of the statistical model is used to calculate a global score for all jobs in the set (operations 404-406). After global scores have been calculated for all jobs in the inverted index, the jobs are ranked by global score (operation 410). For example, the jobs may be ranked in descending order of global score, so that jobs that are higher in the ranking have a higher predicted positive response (e.g., click, apply, etc.) for the user than jobs that are lower in the ranking. A highest-ranked subset of the jobs (e.g., a pre-specified number of jobs with the highest global scores and/or jobs with global scores that exceed a threshold) may then be used to generate a second ranking of the jobs for the user, as described below.

Figure 5:
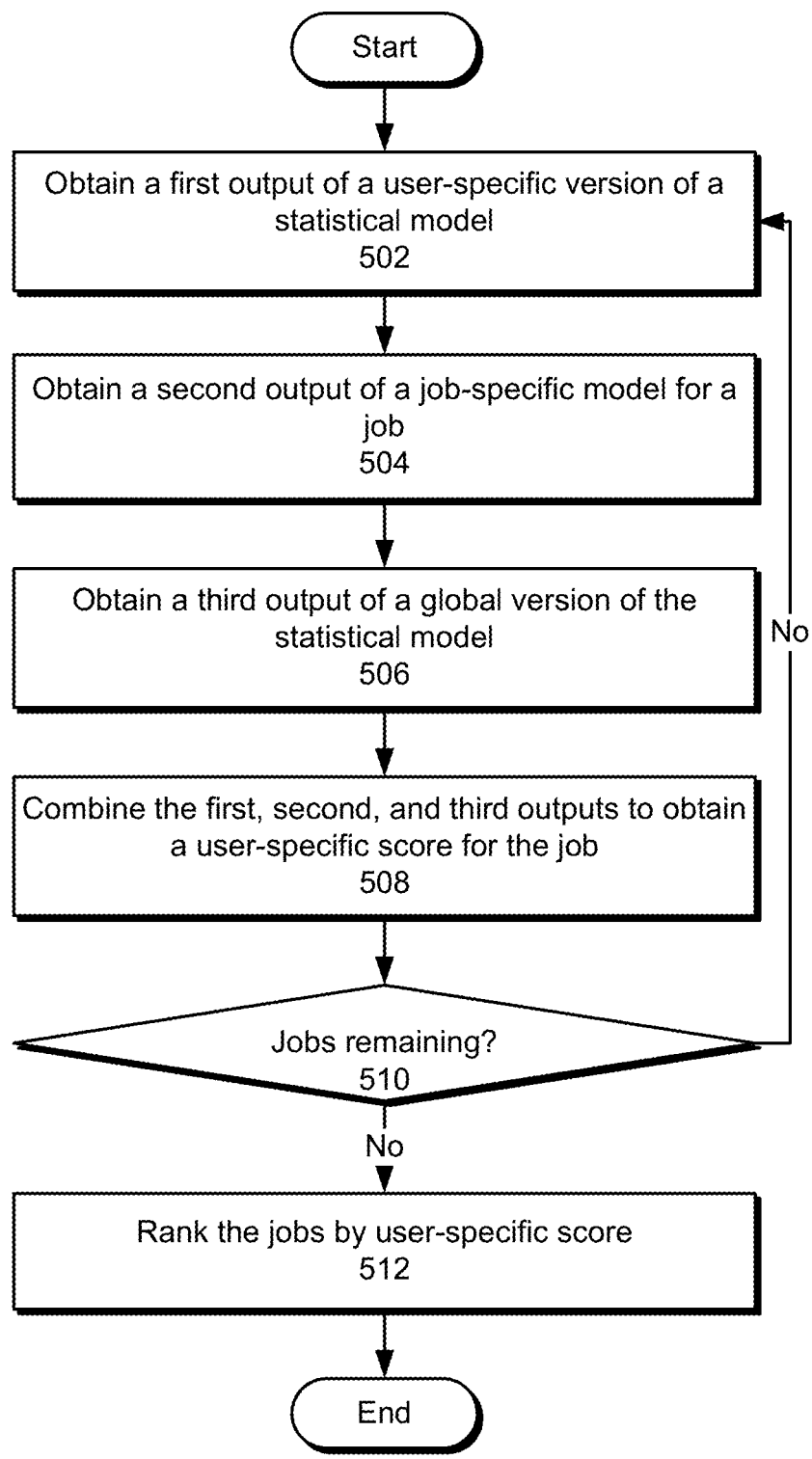
FIG. 5 shows a flowchart illustrating the process of using a user-specific version of a statistical model to generate a ranking of jobs for a user in accordance with the disclosed embodiments.

FIG. 5 shows a flowchart illustrating the process of using a user-specific version of a statistical model to generate a ranking of jobs for a user in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a first output of the user-specific version of the statistical model is obtained, along with a second output of a job-specific model for a job and a third output of a global version of the statistical model (operation 502-506). For example, the user-specific version, job-specific model, and global version may be applied to the same or different combinations of member features, job features, and/or derived features (e.g., similarities between member and job features, cross products of member and job features) to produce the outputs.

Next, the first, second, and third outputs are combined to obtain a user-specific score for the job (operation 508). For example, the outputs may be summed, averaged, weighted, and/or otherwise aggregated to produce the user-specific score.

Operations 502-508 may be repeated for remaining jobs (operation 510). For example, user-specific scores may be generated for each job in a highest ranked subset of jobs from a previous ranking of the jobs, such as the ranking generated from a global version of the statistical model. A different combination of features and models for the user and job may be used to obtain output from the statistical models that is then combined to obtain a user-specific score for the job (operations 502-508). After user-specific scores have been obtained for all users and jobs, the jobs are ranked by user-specific score (operation 512). For example, the jobs may be ranked in descending order of user-specific score, so that jobs that are higher in the ranking have a higher predicted positive response (e.g., click, apply, etc.) for the user than jobs that are lower in the ranking. In turn, some or all of the jobs in the ranking may be outputted as job recommendations to the user, as discussed above.

Figure 6:
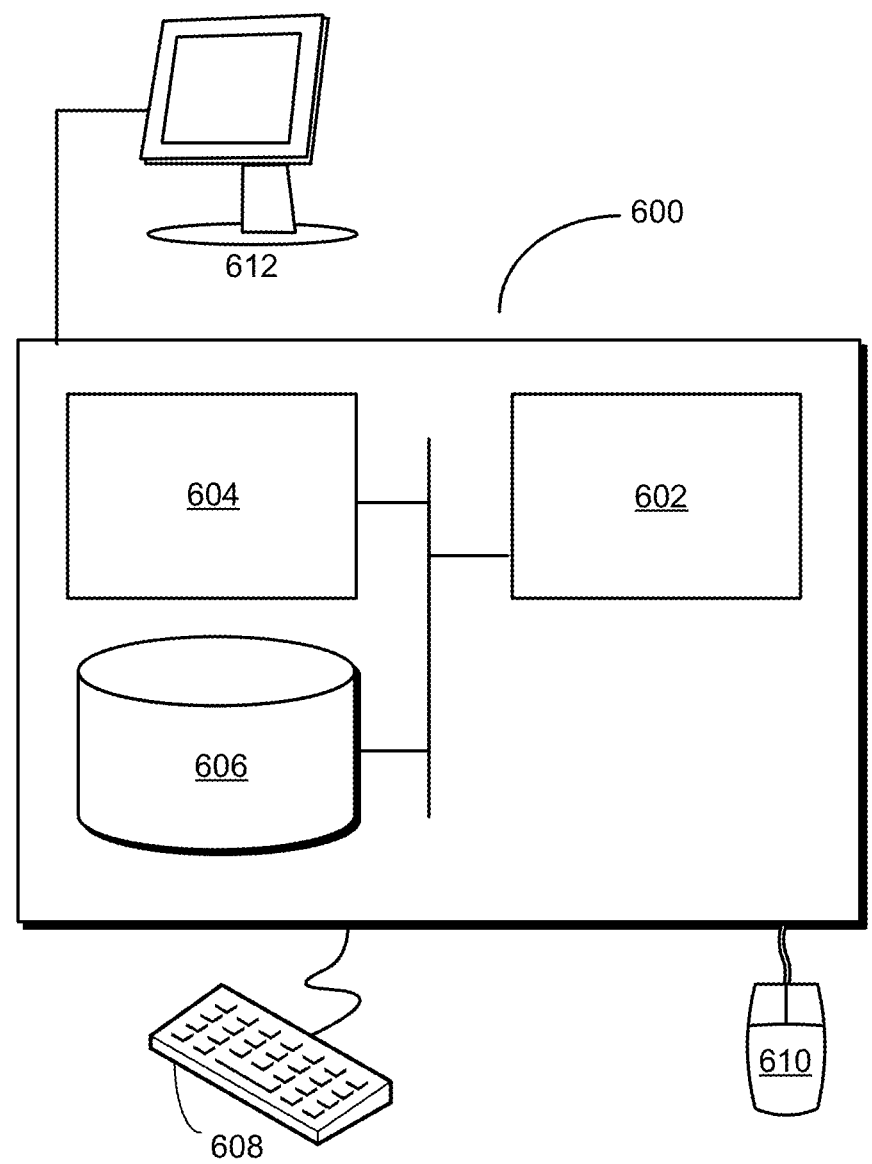
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing data. The system may include an analysis apparatus that obtains a global version of a statistical model and a user-specific version of the statistical model for a user. Next, the analysis apparatus may apply the global version to member features of the user and job features of a set of jobs to generate a first ranking of the jobs for the user. The analysis apparatus may then apply the user-specific version to the member features and the job features for a highest-ranked subset of jobs in the first ranking to generate a second ranking of the jobs for the user. The system may also include a management apparatus that outputs at least a portion of the second ranking as a set of job recommendations.

In addition, one or more components of computer system 600 may be remotely located and connected to the other components over a network. Portions of the present embodiments (e.g., analysis apparatus, management apparatus, statistical models, data repository, features, etc.) may also be located on different nodes of a distributed system that implements the embodiments. For example, the present embodiments may be implemented using a cloud computing system that uses a combination of global and customized models to predict the responses of a set of remote users to a set of job impressions.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining a global version of a statistical model and a user-specific version of the statistical model for a user;
   applying, by one or more computer systems, the global version to member features of the user and job features of a set of jobs to generate a first ranking of the jobs for the user;
   applying, by the one or more computer systems, the user-specific version to the member features and the job features for a highest-ranked subset of jobs in the first ranking to generate a second ranking of the jobs for the user; and
   outputting, to the user, at least a portion of the second ranking as a set of job recommendations;
   wherein applying the global version to the member features and the job features to generate the first ranking of the jobs for the user comprises:
      using a job feature key in an inverted index to retrieve the job features for a subset of the jobs that matches the job feature key; and
      applying the global version to the member features and the retrieved job features to calculate a global score for each job in the subset of jobs.

2. The method of claim 1, further comprising:
   obtaining a set of job-specific models for the highest-ranked subset of jobs; and
   applying the job-specific models to the member features and job features to generate the second ranking of the jobs for the user.

3. The method of claim 2, wherein the second ranking of the jobs for the user is generated by:
   for each job in the highest-ranked subset of jobs, combining a first output of the user-specific version and a second output of a job-specific model for the job to obtain a user-specific score for the job; and
   re-ranking the highest-ranked subset of jobs by the user-specific score.

4. The method of claim 3, wherein the second ranking of the jobs for the user is further generated by:
   combining the first and second outputs with a third output of the global version to obtain the user-specific score for the job.

5. The method of claim 4, wherein the third output of the global version is produced using a cross product of one or more of the member features and one or more of the job features to produce the third output.

6. The method of claim 4, wherein the third output of the global version is produced using a similarity of one or more of the member features to one or more of the job features.

7. The method of claim 1, wherein calculating a global score for each job in the subset of jobs comprises:
   calculating the global score for the job from a weighted combination comprising a set of coefficients in the global version, the member features, and the job features of the job.

8. The method of claim 1, further comprising:
   updating the global version, the user-specific version, and one or more of the job-specific models based on one or more responses to the outputted job recommendations by the user.

9. The method of claim 1, wherein the first and second rankings comprise an estimated probability of applying to a job by the user.

10. An apparatus, comprising:
    one or more processors; and
    memory storing instructions that, when executed by the one or more processors, cause the apparatus to:
       obtain a global version of a statistical model and a user-specific version of the statistical model for a user;
       apply the global version to member features of the user and job features of a set of jobs to generate a first ranking of the jobs for the user;
       apply the user-specific version to the member features and the job features for a highest-ranked subset of jobs in the first ranking to generate a second ranking of the jobs for the user; and
       output at least a portion of the second ranking as a set of job recommendations;
    wherein applying the global version to the member features and the job features to generate the first ranking of the jobs for the user comprises:
       using a job feature key in an inverted index to retrieve the job features for a subset of the jobs that matches the job feature key; and
       applying the global version to the member features and the retrieved job features to calculate a global score for each job in the subset of jobs.

11. The apparatus of claim 10, wherein the memory further stores instructions that, when executed by the one or more processors, cause the apparatus to:
    obtain a set of job-specific models for the highest-ranked subset of jobs; and
    apply the job-specific models to the member features and the job features to generate the second ranking of the jobs for the user.

12. The apparatus of claim 11, wherein the second ranking of the jobs for the user is generated by:
    for each job in the highest-ranked subset of jobs, combining a first output of the user-specific version and a second output of a job-specific model for the job to obtain a user-specific score for the job; and
    re-ranking the highest-ranked subset of jobs by the user-specific score.

13. The apparatus of claim 12, wherein the second ranking of the jobs for the user is further generated by:
    combining the first and second outputs with a third output of the global version to obtain the user-specific score for the job.

14. The apparatus of claim 13, wherein the third output of the global version is produced using a cross product of one or more of the member features and one or more of the job features to produce the third output.

15. The apparatus of claim 13, wherein the third output of the global version is produced using a similarity of one or more of the member features to one or more of the job features.

16. The apparatus of claim 10, wherein calculating a global score for each job in the subset of jobs comprises:
    calculating the global score for the job from a weighted combination comprising a set of coefficients in the global version, the member features, and the job features of the job.

17. A system, comprising:
    an analysis module comprising a non-transitory computer-readable medium comprising instructions that, when executed by a computer, cause the system to:
       obtain a global version of a statistical model and a user-specific version of the statistical model for a user;
       apply the global version to member features of the user and job features of a set of jobs to generate a first ranking of the jobs for the user; and
       apply the user-specific version to the member features and the job features for a highest-ranked subset of jobs in the first ranking to generate a second ranking of the jobs for the user; and
    a management module comprising a non-transitory computer-readable medium comprising instructions that, when executed by the computer, cause the system to output at least a portion of the second ranking as a set of job recommendations;
    wherein applying the global version to the member features and the job features to generate the first ranking of the jobs for the user comprises:
       using a job feature key in an inverted index to retrieve the job features for a subset of the jobs that matches the job feature key; and
       applying the global version to the member features and the retrieved job features to calculate a global score for each job in the subset of jobs.

18. The system of claim 17, wherein the non-transitory computer-readable medium of the analysis module further comprises instructions that, when executed, cause the system to:
    obtain a set of job-specific models for the highest-ranked subset of jobs; and
    apply the job-specific models to the member features and the job features to generate the second ranking of the jobs for the user.

19. The system of claim 17, wherein the second ranking of the jobs for the user is generated by:
    for each job in the highest-ranked subset of jobs, combining a first output of the user-specific version and a second output of a job-specific model for the job to obtain a user-specific score for the job; and
    re-ranking the highest-ranked subset of jobs by the user-specific score.

20. The system of claim 19, wherein the second ranking of the jobs for the user is further generated by:

combining the first and second outputs with a third output of the global version to obtain the user-specific score for the job.

\* \* \* \* \*